United States Patent
Huang et al.

(10) Patent No.: US 9,620,074 B2
(45) Date of Patent: Apr. 11, 2017

(54) LCD PANEL AND PIXEL STRUCTURE THEREOF

(71) Applicant: SHENZHEN CHINA STAR OPTOELECTRONICS TECHNOLOGY CO., LTD., Shenzhen, Guangdong (CN)

(72) Inventors: Shishuai Huang, Guangdong (CN); Tien-Hao Chang, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/782,187

(22) PCT Filed: Jan. 22, 2015

(86) PCT No.: PCT/CN2015/071297
§ 371 (c)(1),
(2) Date: Feb. 1, 2016

(87) PCT Pub. No.: WO2015/110030
PCT Pub. Date: Jul. 30, 2015

(65) Prior Publication Data
US 2016/0351153 A1  Dec. 1, 2016

(30) Foreign Application Priority Data

Jan. 24, 2014  (CN) .......................... 2014 1 0036809

(51) Int. Cl.
*G09G 3/36* (2006.01)
*G02F 1/1362* (2006.01)
(Continued)

(52) U.S. Cl.
CPC ......... *G09G 3/3677* (2013.01); *G02F 1/1368* (2013.01); *G02F 1/13306* (2013.01);
(Continued)

(58) Field of Classification Search
None
See application file for complete search history.

(56) References Cited

U.S. PATENT DOCUMENTS

2009/0268113 A1  10/2009 Chang et al.
2011/0267758 A1  11/2011 Moscovitch
(Continued)

FOREIGN PATENT DOCUMENTS

CN  102385205 A  3/2012
CN  103400563 A  11/2013
(Continued)

OTHER PUBLICATIONS

Yanyan Zhu, the International Searching Authority written comments, Apr. 2015, CN.

*Primary Examiner* — Nicholas Lee

(57) ABSTRACT

The present invention provides a pixel structure including a plurality of pixel cells arranged in a matrix. The pixel cells are defined by a plurality of scan lines and data lines that being mutually intersected. Each pixel cell includes a first discharge control switch, a second discharge control switch, a main pixel area and a sub-pixel region is disposed adjacent the latter. The main pixel area includes a main pixel electrode and a main charge control switch. The sub-pixel area includes a sub-pixel electrode and a sub-charge control switch. The main pixel electrode receives display signals by the main charge control switch. The sub-pixel electrode receives display signals by the sub-charge control switch. The scan line transmitting scan signals of its present pixel (Continued)

cell and the sub-pixel electrode of the above pixel cell are connected by said first discharge control switch.

16 Claims, 4 Drawing Sheets

(51) Int. Cl.
    *G02F 1/133*     (2006.01)
    *G02F 1/1333*     (2006.01)
    *G02F 1/1335*     (2006.01)
    *G02F 1/1368*     (2006.01)
    *G02F 1/1343*     (2006.01)
(52) U.S. Cl.
    CPC .... *G02F 1/13624* (2013.01); *G02F 1/133345* (2013.01); *G02F 1/133514* (2013.01); *G02F 1/134336* (2013.01); *G02F 1/136286* (2013.01); *G09G 3/3688* (2013.01); *G02F 2001/134345* (2013.01); *G02F 2201/121* (2013.01); *G02F 2201/123* (2013.01); *G09G 2300/0426* (2013.01); *G09G 2300/0814* (2013.01); *G09G 2310/0251* (2013.01); *G09G 2320/0242* (2013.01)

(56) References Cited

U.S. PATENT DOCUMENTS

2013/0300641 A1    11/2013    Kim
2015/0138471 A1*    5/2015    Dong ................. G02F 1/13306
                                                                        349/43

FOREIGN PATENT DOCUMENTS

CN          103472644 A    12/2013
CN          103777423 A    5/2014

* cited by examiner

LCD PANEL AND PIXEL STRUCTURE THEREOF

FIELD OF THE INVENTION

The present invention relates to LCD (liquid crystal display) panels and pixel structures thereof.

BACKGROUND OF THE INVENTION

Pixel structure of a current type of LCD panel with low color washout might be implemented by increasing scan lines to respectively control different regions of a same pixel. However, twice number of such chip on films (COF) that must be used in according to this method results increased costs.

Therefore, it's desirable to provide a LCD panels and pixel structure thereof, which can overcome the above-described problem.

SUMMARY OF THE INVENTION

To solve the above technical problem, embodiments of the present invention provide a pixel structure, which comprises a plurality of pixel cells arranged in a matrix. The pixel cells are defined by a plurality of scan lines and data lines that are mutually intersected. Each pixel cell comprises a first discharge control switch, a second discharge control switch, a main pixel area and a sub-pixel region disposed adjacent the latter. The main pixel area comprises a main pixel electrode and a main charge control switch. The sub-pixel area comprises a sub-pixel electrode and a sub-charge control switch. The main pixel electrode receives display signals by the main charge control switch. The sub-pixel electrode receives display signals by the sub-charge control switch. The first discharge control switch connects the scan line transmitting scan signals of its present pixel cell and the sub-pixel electrode of the above pixel cell. The second discharge control switch connects the scan line transmitting scan signals of the previous pixel cell and the sub-pixel electrode of the present pixel cell.

Wherein, a control end of the first discharge control switch is connected to the scan line transmitting scan signals of the present pixel cell.

Wherein, an end of the first discharge control switch is connected to the sub-pixel electrode of the two previous pixel cells.

Wherein, each pixel cell further comprises a first driving line and a second driving line. The control end of the first discharge control switch of each pixel cell is connected to the first driving line. The control end of the second discharge control switch of each pixel cell is connected to the second driving line.

Wherein, an end of the first discharge control switch is connected to the sub-pixel electrode of the previous adjacent pixel cell.

Wherein, the control end of the second discharge control switch is connected to the scan line transmitting scan signals of the present pixel cell.

Wherein, the main charge control switch, the sub-charging control switch, the first discharge control switch and the second discharge control switch are thin film transistors. The control ends of the first discharge control switch and the second discharge control switch are gate electrodes of the thin film transistors.

A liquid crystal display panel comprises an array substrate, a liquid crystal layer and a color filter substrate, wherein the array substrate is oppositely disposed with the color filter substrate. The liquid crystal layer is interposed between the array substrate and the color filter substrate. A plurality of pixel cells arranged in a matrix is arranged on the array substrate. The pixel cells are defined by a plurality of scan lines and data lines that are mutually intersected. Each pixel cell comprises a first discharge control switch, a second discharge control switch, a main pixel area and a sub-pixel region disposed adjacent the latter. The main pixel area comprises a main pixel electrode and a main charge control switch. The sub-pixel area comprises a sub-pixel electrode and a sub-charge control switch. The main pixel electrode receives display signals by the main charge control switch. The sub-pixel electrode receives display signals by the sub-charge control switch. The first discharge control switch connects the scan line transmitting scan signals of its present pixel cell and the sub-pixel electrode of the above pixel cell. The second discharge control switch connects the scan line transmitting scan signals of the previous pixel cell and the sub-pixel electrode of the present pixel cell.

Wherein, a control end of the first discharge control switch is connected to the scan line transmitting scan signals of the present pixel cell.

Wherein, each pixel cell further comprises a first driving line and a second driving line. The control end of the first discharge control switch of each pixel cell is connected to the first driving line. The control end of the second discharge control switch of each pixel cell is connected to the second driving line.

Wherein, an end of the first discharge control switch is connected to the sub-pixel electrode of the previous adjacent pixel cell.

Wherein, the array substrate comprises an insulating layer, a storage capacitor electrode and a plurality of pixel cells having said pixel structure disposed on the insulating layer to display different colors. The storage capacitor electrode is disposed under each corresponding pixel cell and covered by the insulating layer. The color filter substrate comprises a common electrode disposed on a lower surface of the color filter substrate opposite to the array substrate.

The discharge of the sub-pixel electrode could be realized by the pixel structure of the liquid crystal display panel provided by the present invention, without increasing the scanning lines, thus to achieve low color washout design requirements, moreover, the pixel structure could be compatible with forward scan and reverse scan that is suitable for a wide range of applications.

BRIEF DESCRIPTION OF THE DRAWINGS

In order to more clearly illustrate the technical solutions of embodiments the present invention or prior arts, the figures used in the description and the prior arts will be briefly described below. Obviously, the following description of the drawings is only embodiments of the present invention, and for those of ordinary skills, they can get other drawings without creative efforts by the following figures, wherein.

DETAILED DESCRIPTION OF THE PREFERRED EMBODIMENTS

Figure 1:
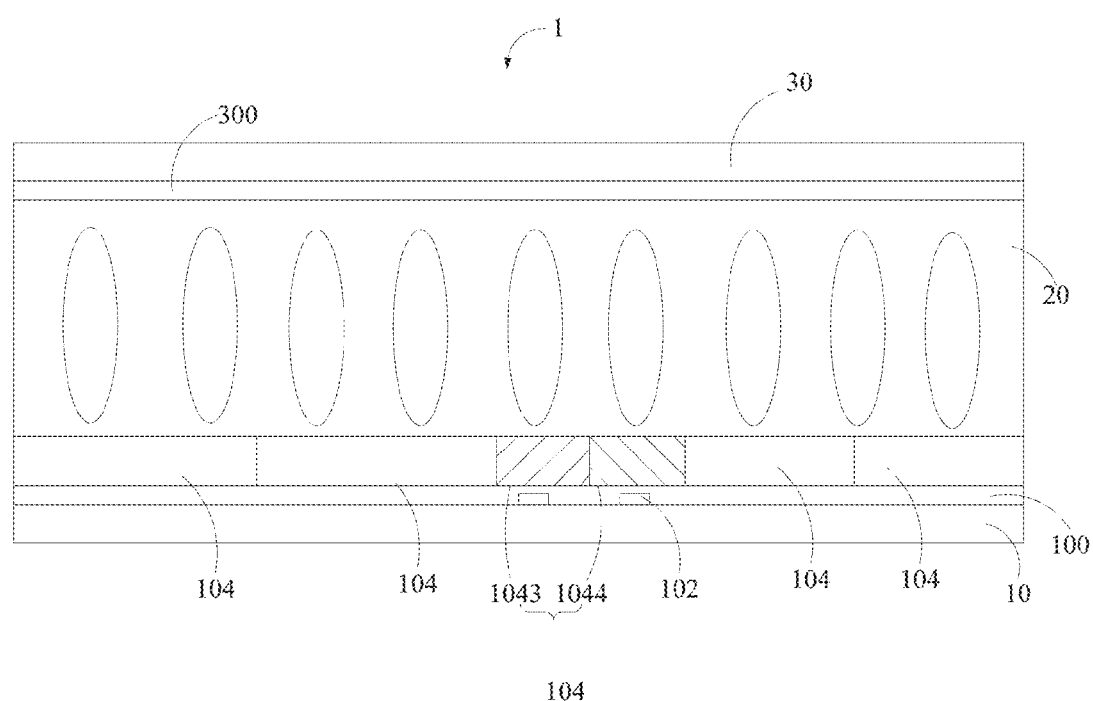
FIG. 1 is a schematic diagram of a LCD panel according to an embodiment of the present invention.

Technical solutions of embodiments of the present invention will be clearly and completely described below referring to the drawings. Obviously, the embodiments will be described are only part but not all of the embodiments of the present invention. All other embodiments obtained by no creative work of ordinary skills according to the embodiments of the present invention are within the scope of the present invention.

Please refer to FIG. 1, a liquid crystal display (LCD) panel 1 includes an array substrate 10, a liquid crystal layer 20 and a color filter substrate 30. Wherein the array substrate 10 is oppositely disposed with the color filter substrate 30, and the liquid crystal layer 20 is interposed between the array substrate 10 and the color filter substrate 30.

The array substrate 10 includes an insulating layer 100, a storage capacitor electrode 102 and a plurality of pixel cells 104 having said pixel structure disposed on the insulating layer 100 to display different colors. The storage capacitor electrode 102 is disposed under each corresponding pixel cell 104 and covered by the insulating layer 100.

The color filter substrate 30 includes a common electrode 300. The common electrode 300 is disposed on a lower surface of the color filter substrate 30 opposite to the array substrate 10.

Figure 2:
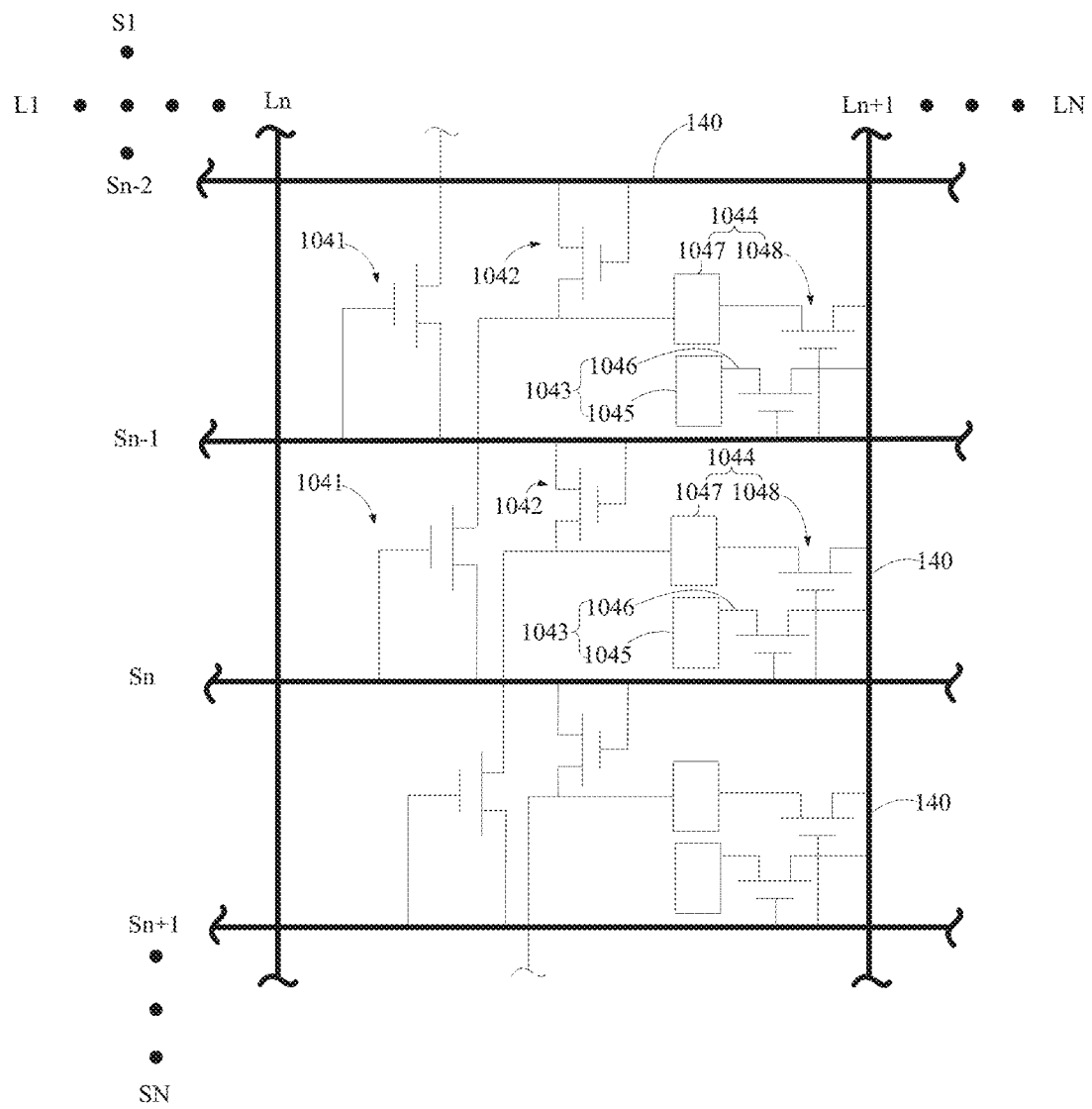
FIG. 2 is a schematic diagram of a pixel cell according to a first embodiment of the invention.

Please refer to FIGS. 1 and 2, the FIG. 2 shows a schematic diagram of a pixel cell 104 provided by the present invention. A plurality of scan lines S1~SN and a plurality of data lines L1~LN are disposed on the array substrate 10. The scan lines S1~SN are transversely disposed to transmit scan signals selected in the pixel cell 104. The data lines L1~LN are longitudinally disposed to transmit display signals selected in the pixel cell 104. The scan lines S1~SN and the data lines L1~LN are perpendicularly intersected each other to define the pixel cell 104 arranged in a matrix. In other embodiments, the scan lines S1~SN and the data lines L1~LN might not be perpendicularly intersected each other.

Each pixel cell 104 includes a first discharge control switch 1041, a second discharge control switch 1042, a main pixel area 1043 and a sub-pixel region 1044 disposed adjacent the latter. The main pixel area 1043 includes a main pixel electrode and a main charge control switch. Storage capacitor electrodes 102 are disposed respectively under the main pixel area 1043 and the sub-pixel region 1044. The main pixel area 1043 includes a main pixel electrode 1045 and a main charge control switch 1046. The sub-pixel area 1044 includes a sub-pixel electrode 1047 and a sub-charge control switch 1048. The first discharge control switch 1041 is connected to the lower scan line Sn of the pixel cell 104 and the sub-pixel electrode 1047 located in other upper the pixel cell 104, thus to discharge the sub-pixel electrode 1047 in the upper pixel cell 104 by controlling of the scan signal of the lower scan line Sn. The second discharge control switch 1042 is connected to the upper scan line Sn−1 of the pixel cell 104 and the sub-pixel electrode 1047 in the pixel cell 104, thus to discharge the sub-pixel electrode 1047 in the pixel cell 104 by controlling of the scan signal of the upper scan line Sn−1. A potential difference might be formed between the discharged sub-pixel electrode 1047 and the main pixel electrode 1045 in a same pixel cell 104 to reduce the color washout. In the present embodiment, the first discharge control switch 1041 is connected to the sub-pixel electrode 1047 of the previous adjacent pixel cell 104. The second discharge control switch 1042 is connected to the sub-pixel electrode 1047 of the next adjacent pixel cell 104.

The main charge control switch 1046, the sub-charging control switch 1048, the first discharge control switch 1041 and the second discharge control switch 1042 are thin film transistors. A gate of the main charge control switch 1046 is a controlling end and connected to the scan lines S1~SN. A source of the main charge control switch 1046 is connected to the date line. A drain of the main charge control switch 1046 is connected to the main pixel electrode 1045. A gate of the sub-charging control switch 1048 is a controlling end and connected to the scan lines S1~SN. A source of the sub-charging control switch 1048 is connected to the data lines L1~LN. A drain of the sub-charging control switch 1048 is connected to the sub-pixel electrode 1047.

A gate of the first discharge control switch 1041 is a controlling end. The gate and a source of the first discharge control switch 1041 are all connected to the lower scan line Sn of the pixel cell 104. A drain of the first discharge control switch 1041 is connected to the sub-pixel electrode 1047 of the previous pixel cell 104. A gate of the second discharge control switch 1042 is a controlling end. The gate and a source of the second discharge control switch 1042 are all connected to the upper scan line Sn−1 of the pixel cell 104. A drain of the second discharge control switch 1042 is connected to the sub-pixel electrode 1047 of the pixel cell 104.

The nth pixel unit 104 shown in the FIG. 2 will be described as an example hereinafter.

Scan signals are successively loaded from the first scan line S1 to the Nth scan line SN that is implemented by a forward scanning mode. When the scan signal is transmitted along the nth scan line Sn, the main charge control switch 1046 and the sub-charging control switch 1048 of the nth pixel cell 104 are respectively conducted by the scan signals via their respective gates. The display signals of the nth pixel cell 104 could charge the main pixel electrode 1045 and the sub-pixel electrode 1047 of the nth pixel cell 104 by the main charge control switch 1046 and the sub-charging control switch 1048 along the nth date line Ln. Meanwhile, the first discharge control switch 1041 connected with the nth scan line Sn could be conducted to discharge the sub-pixel electrode 1047 of the n−1st pixel cell 104. Because the main pixel electrode 1045 and the sub-pixel electrode 1047 of the n−1st pixel cell 104 have been already charged when the scan signals are transmitted by the n−1st scan line Sn−1 along the n−1st scan line, so the potentials between the main pixel electrode 1045 and the sub-pixel electrode 1047 of the n−1st pixel cell 104 might be different after the sub-pixel electrode 1047 of the n−1st pixel cell 104 is discharged by the first discharge control switch 1041 of the nth pixel cell 104, thus to achieve the low color washout. By the same way, the first discharge control switch 1041 could be conducted to discharge the sub-pixel electrode 1047 of the nth pixel cell 104 when the scan signals are transmitted along the n+1st scan line Sn+1, with the result that the sub-pixel electrode 1047 of the nth pixel cell 104 has a different potential with that of the main pixel electrode 1045. Although the second discharge control switch 1042 of the n+1st pixel cell 104 could be conducted when the scan signals are transmitted along the nth scan line, at this point, the sub-pixel electrode 1047 of the n+1st pixel cell 104 would not be discharged again, the reason is that it has been discharged in the previous frame scanning period.

Scan signals are successively loaded from the Nth scan line SN to the first scan line S1, that is implemented by a reverse scanning mode. When the scan signal is transmitted along the nth scan line Sn, the main charge control switch 1046 and the sub-charging control switch 1048 of the nth pixel cell 104 are respectively conducted by the scan signals via their respective gates. The display signals of the nth pixel cell 104 could charge the main pixel electrode 1045 and the sub-pixel electrode 1047 of the nth pixel cell 104 by the main charge control switch 1046 and the sub-charging control switch 1048 along the nth date line Ln. Meanwhile, the second discharge control switch 1042 connected with the nth scan line Sn could be conducted to discharge the sub-pixel electrode 1047 of the n+1st pixel cell 104. Because the main pixel electrode 1045 and the sub-pixel electrode 1047 of the n+1st pixel cell 104 have been already charged when the scan signals are transmitted by the n+1st scan line Sn+1 along the n+1st scan line, so the potentials between the main pixel electrode 1045 and the sub-pixel electrode 1047 of the n+1st pixel cell 104 might be different after the sub-pixel electrode 1047 of the n+1st pixel cell 104 is discharged by the first discharge control switch 1041 of the nth pixel cell 104, thus to achieve the low color washout. By the same way, the second discharge control switch 1042 could be conducted to discharge the sub-pixel electrode 1047 of the nth pixel cell 104 when the scan signals are transmitted along the n−1st scan line Sn−1, with the result that the sub-pixel electrode 1047 of the nth pixel cell 104 has a different potential with that of the main pixel electrode 1045. Although the first discharge control switch 1041 of the n−1st pixel cell 104 could be conducted when the scan signals are transmitted along the nth scan line Sn, at this point, the sub-pixel electrode 1047 of the n−1st pixel cell 104 would not be discharged again, the reason is that it has been discharged in the previous frame scanning period.

According to the pixel structure of the LCD panel 1 provided by the present invention, the sub-pixel electrode 1047 could be discharged without increasing the scanning lines to realize low color washout, furthermore, the pixel structure might be applied in a large field because it is compatible with the forward scan and the reverse scan.

Figure 3:
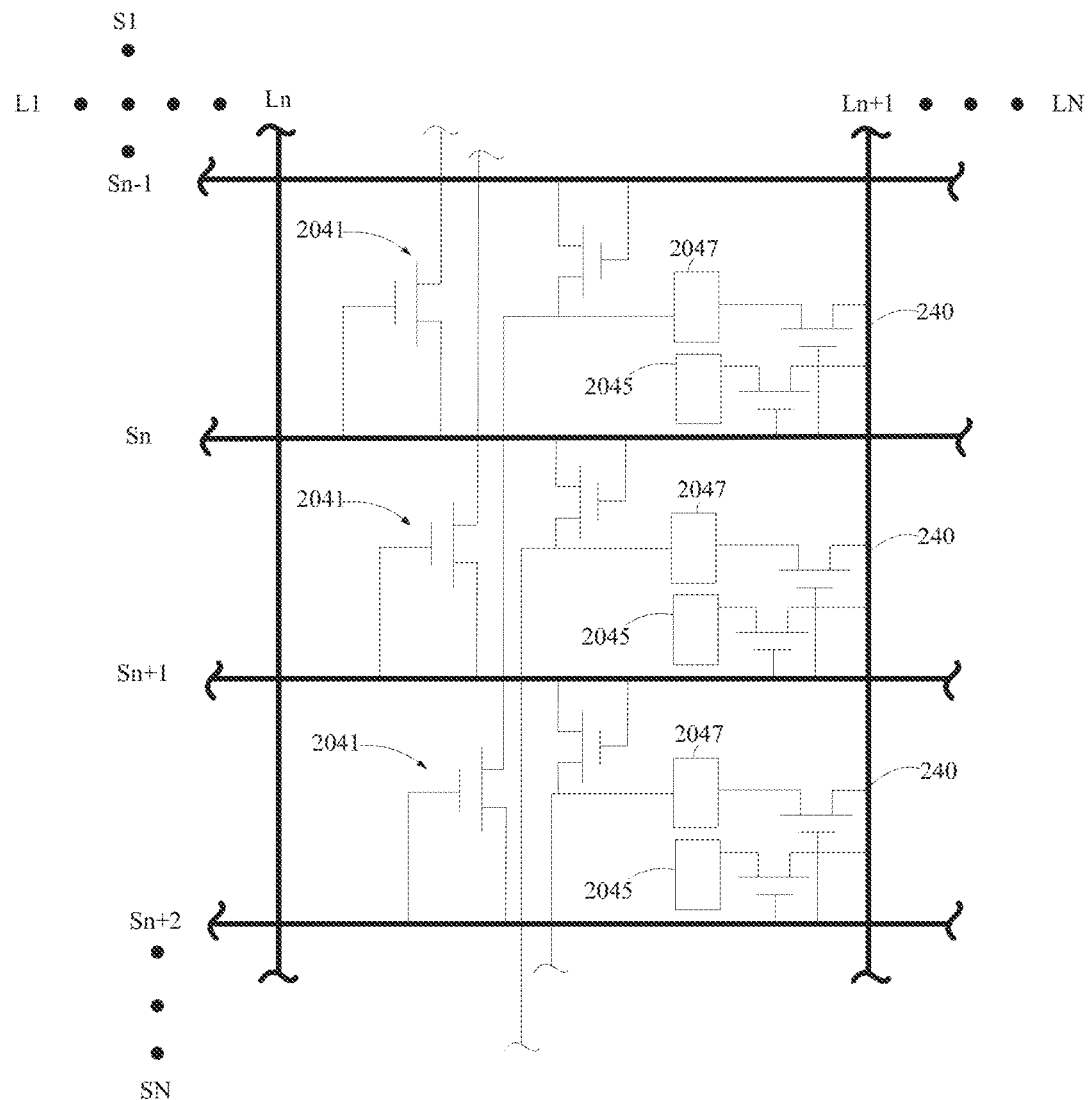
FIG. 3 is a schematic diagram of a pixel cell according to a second embodiment of the invention.

Please refer to FIG. 3, a pixel cell 204 according to the second embodiment of the present invention has basically the same structure with the pixel cell 104 of the first embodiment, the exception is: a drain of a first discharge control switch 2041 inside the pixel cell 204 is connected to sub-pixel electrodes 2047 of the two above pixel cells 204. Correspondingly, when the forward scan is executed, the sub-pixel electrode 2047 of the nth pixel cells 204 might begin to discharge after its charge by the first discharge control switch 2041 of the n+2nd scan line only as the next two scan lines Sn+2, that is the n+2nd scan line Sn+2, are selected, thus to realize the potential difference between the main pixel electrodes 2045 in a same pixel cell 204.

Figure 4:
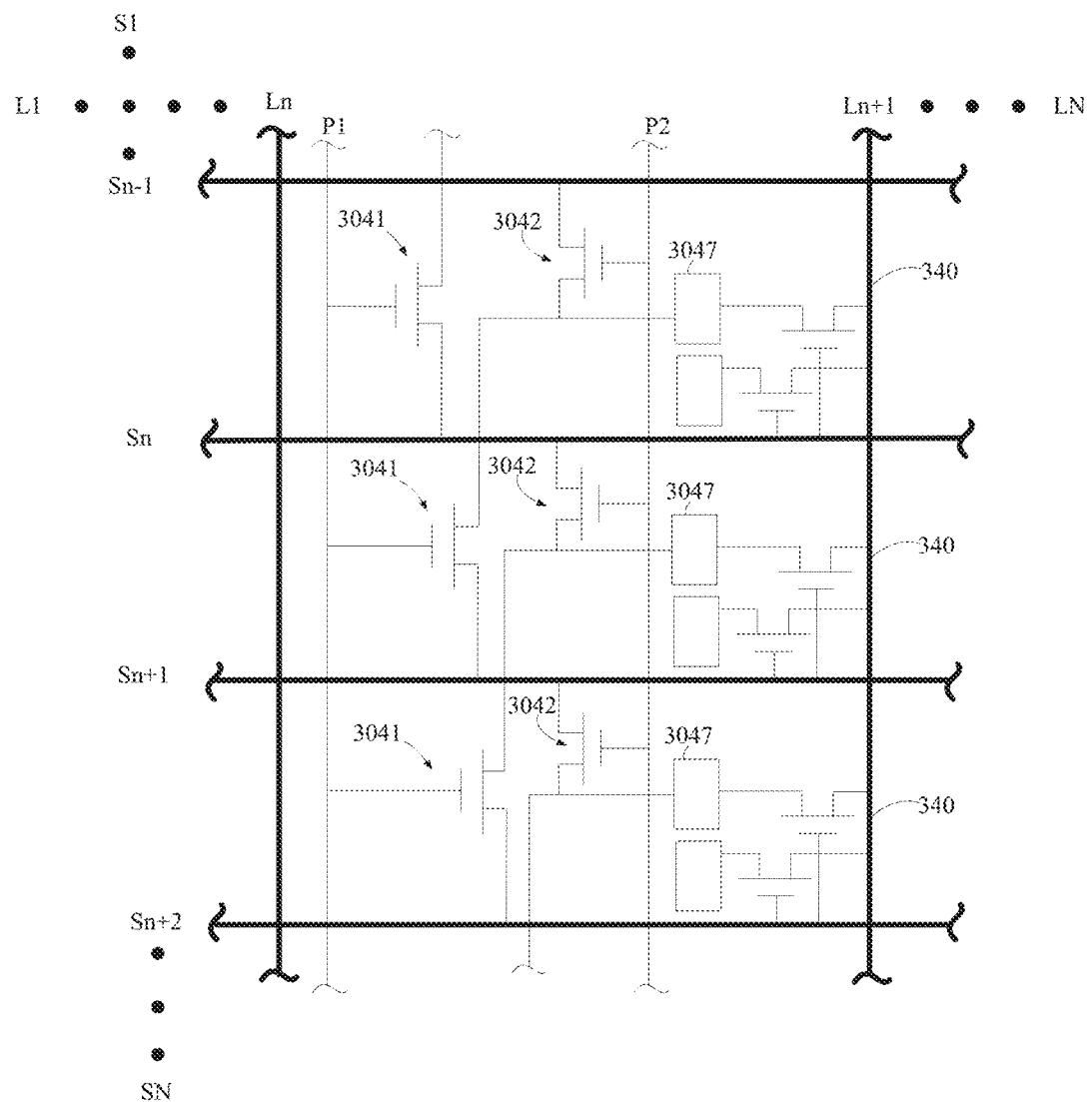
FIG. 4 is a schematic diagram of a pixel cell according to a third embodiment of the invention.

As shown in FIG. 4, a pixel cell 304 according to the third embodiment of the present invention has basically the same structure with the pixel cell 104 of the first embodiment, the exception is: the pixel cell 304 further includes a first drive line P1 and a second drive line P2. Gates of first discharge control switches 3041 of each pixel cell 304 are all connected to the first driveline P1. And gates of second discharge control switches 3042 of each pixel cell 304 are all connected to the second driveline P2. When the forward scan is executed, the first discharge control switches 3041 of each pixel cell 304 could be conducted by transmitting driving signals to the first driveline P1. The scan signals might be transmitted to a sub-pixel electrode 3047 of the above n−1st pixel cells 304 by the first discharge control switch 3041 of each pixel cell 304 when the scan signals are transmitted along the nth scan line Sn to discharge the sub-pixel electrode 3047 of the above n−1st pixel cells 304. The sub-pixel electrode 3047 of the above nth pixel cells 304 could discharge by the conducted first discharge control switches 3041 of the n+1st pixel cell 304 when the scan signals are transmitted along the next n+1st scan line Sn+1. The second discharge control switches 3042 of each pixel cell 304 are all cutoff because there is no signal applied on the second driveline P2 during the forward scan, so the sub-pixel electrode 3047 connected to the second discharge control switches 3042 could not be discharged.

The above disclosure is only a preferred embodiment the present invention; certainly, it cannot be used to limit the scope of the invention as claimed. Therefore, the equivalent changes made according with the claim of the present invention are still covered in the scope of the present invention.

What is claimed is:

1. A pixel structure comprising a plurality of pixel cells arranged in a matrix, said pixel cells being defined by a plurality of scan lines and data lines that being mutually intersected, each pixel cell comprising a first discharge control switch, a second discharge control switch, a main pixel area and a sub-pixel region being disposed adjacent the latter, said main pixel area comprising a main pixel electrode and a main charge control switch, said sub-pixel area comprising a sub-pixel electrode and a sub-charge control switch, said main pixel electrode receiving display signals by said main charge control switch, said sub-pixel electrode receiving display signals by said sub-charge control switch, the scan line transmitting scan signals of a current pixel cell and the sub-pixel electrode of the pixel cell being connected by said first discharge control switch, the scan line transmitting scan signals of a previous pixel cell and the sub-pixel electrode of the current pixel cell being connected by said second discharge control switch.

2. The pixel structure according to claim 1, wherein a control end of the first discharge control switch is connected to the scan line transmitting scan signals of the current pixel cell.

3. The pixel structure according to claim 2, wherein an end of the first discharge control switch is connected to the sub-pixel electrode of the two previous pixel cells.

4. The pixel structure according to claim 1, wherein each pixel cell further comprises a first driving line and a second driving line, said control end of the first discharge control switch of each pixel cell is connected to the first driving line, said control end of the second discharge control switch of each pixel cell is connected to the second driving line.

5. The pixel structure according to claim 2, wherein an end of the first discharge control switch is connected to the sub-pixel electrode of the previous adjacent pixel cell.

6. The pixel structure according to claim 4, wherein an end of the first discharge control switch is connected to the sub-pixel electrode of the previous adjacent pixel cell.

7. The pixel structure according to claim 1, wherein the control end of the second discharge control switch is corrected to the scan line transmitting scan signals of the current pixel cell.

8. The pixel structure according to claim 1, wherein said main charge control switch, said sub-charging control switch, said first discharge control switch and said second discharge control switch are thin film transistors, said control ends of the first discharge control switch and the second discharge control switch are gate electrodes of the thin film transistors.

9. The pixel structure according to claim 2, wherein said main charge control switch, said sub-charging control switch, said first discharge control switch and said second discharge control switch are thin film transistors, said control ends of the first discharge control switch and the second discharge control switch are gate electrodes of the thin film transistors.

10. The pixel structure according to claim 4, wherein said main charge control switch, said sub-charging control switch, said first discharge control switch and said second discharge control switch are thin film transistors, said control ends of the first discharge control switch and the second discharge control switch are gate electrodes of the thin film transistors.

11. The pixel structure according to claim 6, wherein said main charge control switch, said sub-charging control switch, said first discharge control switch and said second discharge control switch are thin film transistors, said control ends of the first discharge control switch and the second discharge control switch are gate electrodes of the thin film transistors.

12. A liquid crystal display panel, comprising an array substrate, a liquid crystal layer and a color filter substrate, said array substrate being oppositely disposed with said color filter substrate, said liquid crystal layer being interposed between the array substrate and the color filter substrate, wherein a plurality of pixel cells arranged in a matrix being arranged on the array substrate, said pixel cells being defined by a plurality of scan lines and data lines that being intersected, each pixel cell comprising a first discharge control switch, a second discharge control switch, a main pixel area and a sub-pixel region disposed adjacent the latter, said main pixel area comprising a main pixel electrode and a main charge control switch, said sub-pixel area comprising a sub-pixel electrode and a sub-charge control switch, said main pixel electrode receiving display signals by the main charge control switch, said sub-pixel electrode receiving display signals by the sub-charge control switch, the scan line transmitting scan signals of a current pixel cell and the sub-pixel electrode of the pixel cell being connected by said first discharge control switch, the scan line transmitting scan signals of a previous pixel cell and the sub-pixel electrode of the current pixel cell being connected by said second discharge control switch.

13. The liquid crystal display panel according to claim 12, wherein a control end of the first discharge control switch is connected to the scan line transmitting scan signals of the current pixel cell.

14. The liquid crystal display panel according to claim 12, wherein each pixel cell further comprises a first driving line and a second driving line, said control end of the first discharge control switch of each pixel cell is connected to the first driving line, said control end of the second discharge control switch of each pixel cell is connected to the second driving line.

15. The liquid crystal display panel according to claim 14, wherein an end of the first discharge control switch is connected to the sub-pixel electrode of the previous adjacent pixel cell.

16. The liquid crystal display panel according to claim 12, wherein said array substrate comprises an insulating layer, a storage capacitor electrode and a plurality of pixel cells having said pixel structure disposed on the insulating layer to display different colors: the storage capacitor electrode is disposed under each corresponding pixel cell and covered by the insulating layer; the color filter substrate comprises a common electrode disposed on a lower surface of the color filter substrate opposite to the array substrate.

* * * * *